US012632002B2

(12) United States Patent
Raksha et al.

(10) Patent No.: US 12,632,002 B2
(45) Date of Patent: May 19, 2026

(54) OPTICAL SECURITY DEVICE BASED ON A SURFACE OF REVOLUTION

(71) Applicant: VIAVI Solutions Inc., Chandler, AZ (US)

(72) Inventors: Vladimir P. Raksha, Santa Rosa, CA (US); Cornelis Jan Delst, Fairfax, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/678,195

(22) Filed: May 30, 2024

(65) Prior Publication Data

US 2024/0319654 A1 Sep. 26, 2024

Related U.S. Application Data

(63) Continuation of application No. 17/448,932, filed on Sep. 27, 2021, now Pat. No. 12,045,001, which is a continuation of application No. 16/862,729, filed on Apr. 30, 2020, now Pat. No. 11,150,595, which is a continuation of application No. 16/102,250, filed on Aug. 13, 2018, now Pat. No. 10,642,214.

(51) Int. Cl.
*G03G 21/04* (2006.01)
*B41M 3/14* (2006.01)
*G07D 7/12* (2016.01)

(52) U.S. Cl.
CPC ........... *G03G 21/043* (2013.01); *B41M 3/146* (2013.01); *G07D 7/12* (2013.01)

(58) Field of Classification Search
CPC ..... G03G 21/043; G03G 21/04; B41M 3/146; B41M 3/14; G07D 7/12
USPC .................. 283/67, 72, 94, 98, 99, 109, 901
See application file for complete search history.

(56) References Cited

U.S. PATENT DOCUMENTS

| | | | |
|---|---|---|---|
| 8,343,615 | B2 | 1/2013 | Raksha et al. |
| 9,659,696 | B2 | 5/2017 | Loginov et al. |
| 9,724,956 | B2 | 8/2017 | Schmid et al. |

(Continued)

FOREIGN PATENT DOCUMENTS

| | | | |
|---|---|---|---|
| CN | 1853961 | A | 11/2006 |
| CN | 101070040 | A | 11/2007 |

(Continued)

OTHER PUBLICATIONS

Extended European Search Report for Application No. EP19190942.3, mailed on Jan. 20, 2020, 11 pages.

(Continued)

*Primary Examiner* — Justin V Lewis
(74) *Attorney, Agent, or Firm* — Harrity & Harrity, LLP

(57) ABSTRACT

An optical article printed on a substrate may include an organic binder; and a plurality of reflective magnetic platelets provided in the organic binder, wherein the plurality of reflective magnetic platelets are substantially aligned in accordance with at least part of a surface of revolution, and wherein the plurality of reflective magnetic platelets are aligned to cause a first reflective effect of the optical article when the substrate is rotated around a first axis and to cause a second reflective effect of the optical article when the substrate is rotated around a second axis, wherein the first reflective effect is different from the second reflective effect.

20 Claims, 12 Drawing Sheets

(56) References Cited

U.S. PATENT DOCUMENTS

| | | | |
|---|---|---|---|
| 10,126,317 | B2 | 11/2018 | Heise et al. |
| 10,279,618 | B2 | 5/2019 | Degott et al. |
| 10,642,214 | B2 | 5/2020 | Raksha |
| 10,715,386 | B2 | 7/2020 | Feng et al. |
| 10,752,042 | B2 | 8/2020 | Raksha et al. |
| 10,850,550 | B2 | 12/2020 | Rich et al. |
| 11,150,595 | B2 | 10/2021 | Raksha et al. |
| 2004/0051297 | A1 | 3/2004 | Raksha et al. |
| 2006/0097515 | A1 | 5/2006 | Raksha et al. |
| 2012/0205905 | A1* | 8/2012 | Degott .................. B42D 25/29 427/7 |
| 2014/0003096 | A1 | 1/2014 | Deng |
| 2014/0077485 | A1 | 3/2014 | Raksha et al. |
| 2016/0187546 | A1 | 6/2016 | Raksha et al. |
| 2016/0339733 | A1 | 11/2016 | Holmes |
| 2018/0111406 | A1 | 4/2018 | Loginov et al. |
| 2020/0257235 | A1 | 8/2020 | Raksha et al. |
| 2022/0026844 | A1 | 1/2022 | Raksha et al. |

FOREIGN PATENT DOCUMENTS

| | | | |
|---|---|---|---|
| CN | 104024866 | A | 9/2014 |
| CN | 104053552 | A | 9/2014 |
| CN | 104159732 | A | 11/2014 |
| CN | 104903009 | A | 9/2015 |
| EP | 1854642 | A2 | 11/2007 |
| EP | 2484455 | A1 | 8/2012 |
| JP | 2006293358 | A | 10/2006 |
| JP | 2014510651 | A | 5/2014 |
| JP | 2016531729 | A | 10/2016 |
| JP | 2016534187 | A | 11/2016 |
| KR | 20180014687 | A | 2/2018 |
| PH | 12018500182 | A1 | 7/2018 |
| TW | 200642770 | A | 12/2006 |
| TW | 201726265 | A | 8/2017 |
| TW | 201740146 | A | 11/2017 |
| WO | 2013106462 | A1 | 7/2013 |
| WO | 2013106470 | A1 | 7/2013 |
| WO | 2014051659 | A1 | 4/2014 |
| WO | 2017080698 | A1 | 5/2017 |

OTHER PUBLICATIONS

Extended European Search Report for European Application No. EP252186663 dated Mar. 30, 2026, 14 pages.

* cited by examiner

200

OPTICAL SECURITY DEVICE BASED ON A SURFACE OF REVOLUTION

RELATED APPLICATIONS

This application is a continuation of U.S. patent application Ser. No. 17/448,932, filed Sep. 27, 2021, which is a continuation of U.S. patent application Ser. No. 16/862,729, filed Apr. 30, 2020 (now U.S. Pat. No. 11,150,595), which is a continuation of U.S. patent application Ser. No. 16/102,250, filed Aug. 13, 2018 (now U.S. Pat. No. 10,642,214), the contents of which are incorporated herein by reference in their entireties.

BACKGROUND

Some documents, such as monetary instruments, certificates, and/or the like, may use certain optical articles to combat counterfeiting. One example of such an optical article is an ink with a variable optical property (e.g., color, reflectivity) based on a viewing angle.

SUMMARY

In some possible implementations, an optical article printed on a substrate may include an organic binder; and a plurality of reflective magnetic platelets provided in the organic binder, wherein the plurality of reflective magnetic platelets are substantially aligned in accordance with at least part of a surface of revolution, and wherein the plurality of reflective magnetic platelets are aligned to cause a first reflective effect of the optical article when the substrate is rotated around a first axis and to cause a second reflective effect of the optical article when the substrate is rotated around a second axis, wherein the first reflective effect is different from the second reflective effect.

In some possible implementations, a method for forming an optical article on a substrate may include providing an organic binder that includes a plurality of reflective magnetic platelets on the substrate; applying a magnetic field to the organic binder using one or more magnets, wherein the magnetic field aligns the plurality of reflective magnetic platelets substantially in accordance with at least part of a surface of revolution, wherein the plurality of reflective magnetic platelets are aligned to cause a first reflective effect of the optical article when the substrate is rotated around a first axis and to cause a second reflective effect of the optical article when the substrate is rotated around a second axis, wherein the first reflective effect is different from the second reflective effect; and setting or hardening the organic binder.

In some possible implementations, a document may include an optical article comprising a plurality of reflective magnetic platelets, wherein the plurality of reflective magnetic platelets are substantially aligned in accordance with at least part of a surface of revolution, and wherein the plurality of reflective magnetic platelets are aligned to cause a first reflective effect of the optical article when the optical article is rotated around a first axis and to cause a second reflective effect of the optical article when the optical article is rotated around a second axis, wherein the first reflective effect is different from the second reflective effect.

DETAILED DESCRIPTION

The following detailed description of example implementations refers to the accompanying drawings. The same reference numbers in different drawings may identify the same or similar elements.

An optical article may generate a reflective effect based on an angle of light or a viewing angle. Some optical articles may use reflective magnetic platelets to create such a reflective effect. For example, magnetic platelets may be dispersed in an organic binder and coated on a substrate, such as a flexible substrate (e.g., a document, currency, a certificate, a transaction card, etc.). The magnetic platelets may be aligned in accordance with (e.g., using) a magnetic field, which may cause the magnetic platelets to exhibit the reflective properties of a shaped three-dimensional mirror. This may be referred to as a Fresnel-like reflective effect. The organic binder may be set or hardened (e.g., using curing, ultraviolet light, heat, epoxy, etc.). Notably, the optical article may be thin (e.g., may not be significantly thicker than the substrate) and flexible, which makes the optical article useful for currency and other such applications.

Some implementations described herein provide optical articles based on a surface of revolution. A surface of revolution is a three-dimensional surface generated by rotating a two-dimensional curve about an axis. A surface of revolution may have azimuthal symmetry. Some implementations described herein may use a magnetic field that is generated based on a surface of revolution to create a reflective effect that is based on the surface of revolution. For example, some implementations described herein may be based on a funnel-shaped surface of revolution, and may provide a reflective effect that resembles a funnel in some orientations. Other implementations described herein may be based on a saddle-shaped surface of revolution, and may provide a reflective effect that resembles a saddle in some orientations.

The above-described optical articles may have magnetic platelets that are aligned to cause a first reflective effect of the optical article when the substrate (or optical article) is rotated around a first axis, and to cause a second, different, reflective effect when the substrate or optical article is rotated around a second axis. The reflective effects, as well as magnet configurations to align the magnetic platelets accordingly, are described in more detail below. By providing reflective effects that are different when the optical article is rotated about different axes, complexity of the optical article is improved in comparison to optical articles that use a single axis of rotation. Thus, security of a document that uses the optical article is improved in comparison to documents using optical articles that use a single axis of rotation.

Figure 1A:
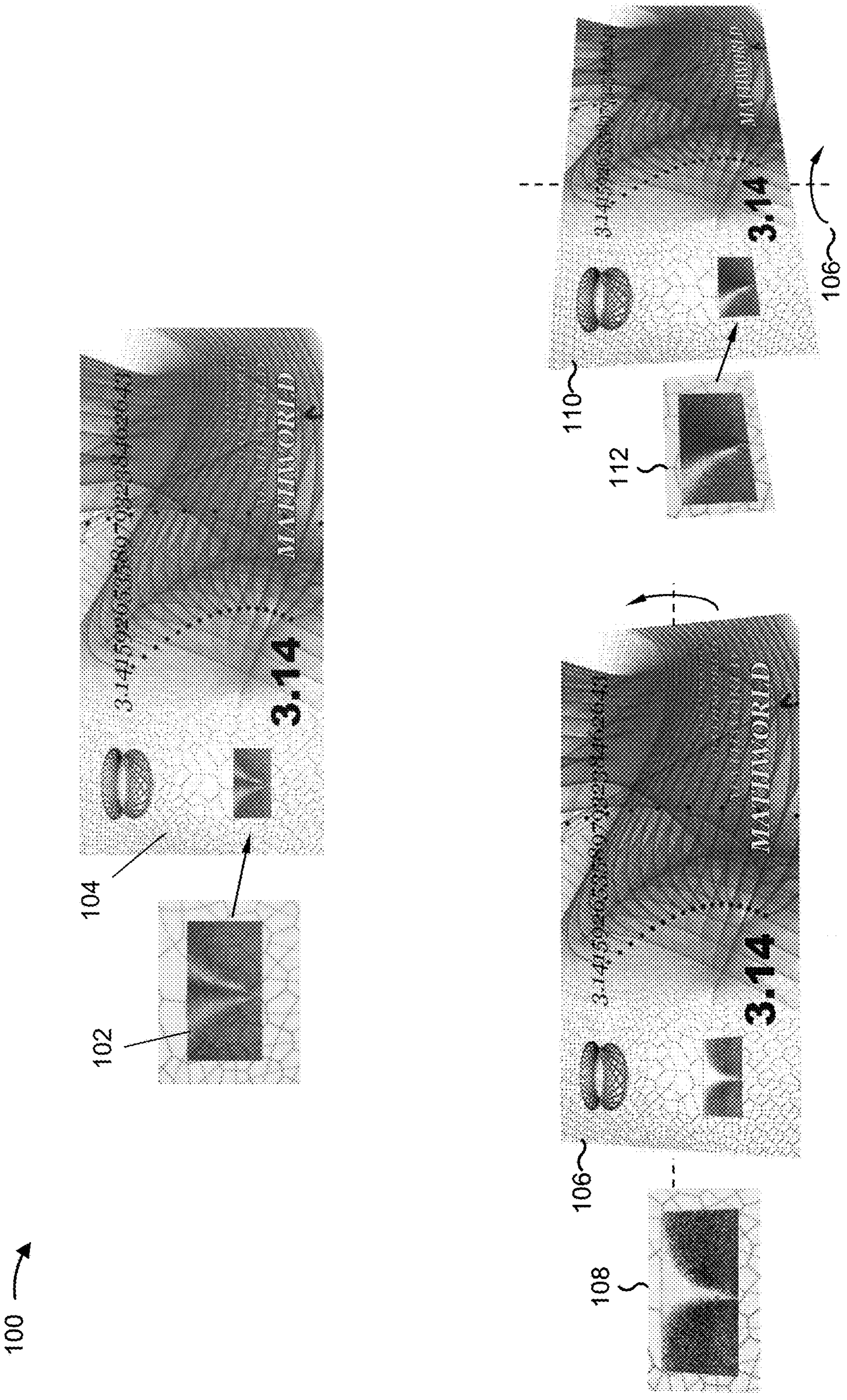
FIGS. 1A-1E are diagrams of an optical article that is formed based on a funnel-shaped surface of revolution.

FIGS. 1A-1E are diagrams of an example 100 of an optical article 102 that is formed based on a funnel-shaped surface of revolution. An expanded view of the optical article 102 in a first view (e.g., a head-on view without rotating a substrate 104 around an axis) is shown at the top of FIG. 1A. Here, the substrate 104 is a document, such as a currency note. In some implementations, the substrate 104 may not include the document. For example, the optical article 102 may be formed on a substrate that is affixed to the document (e.g., before or after the optical article 102 is formed).

As shown, the optical article 102 exhibits a funnel-shaped reflection, which may be based on alignment of magnetic platelets of the optical article 102 with a magnetic field that is based on a funnel-shaped surface of revolution. This is described in more detail in connection with FIGS. 1B and 1C, below.

As shown by reference number 106, when the substrate 104 (or the optical article 102) is rotated around a first axis (e.g., a horizontal axis), the rotation may cause a first reflective effect 108. Here, the first reflective effect 108 is a widening (in the horizontal direction) of a top of the funnel-shaped reflection and a narrowing (in the horizontal direction) of the bottom of the funnel-shaped reflection. This may be based on the alignment of the magnetic platelets with the funnel-shaped surface of revolution, as described in more detail below. In some implementations, the first reflective effect may be a widening of a first portion (e.g., the top) of a reflection, and a narrowing of a second portion (e.g., the bottom) of the reflection.

As shown by reference number 110, when the substrate 104 (or the optical article 102) is rotated around a second axis (e.g., a vertical axis and/or an axis orthogonal to the first axis), the rotation may cause a second reflective effect 112 that is different from the first reflective effect 108. Here, the second reflective effect 108 is a shifting to the left of a top of the funnel-shaped reflection while a bottom point of the funnel-shaped reflection remains substantially unmoved. In other words, the second reflective effect may be a first lateral motion of a first portion of a reflection (e.g., the shifting to the left or right of the top of the funnel-shaped reflection) that is larger than a second lateral motion of a second portion of the reflection (e.g., the bottom point remaining substantially unmoved).

Figure 1B:
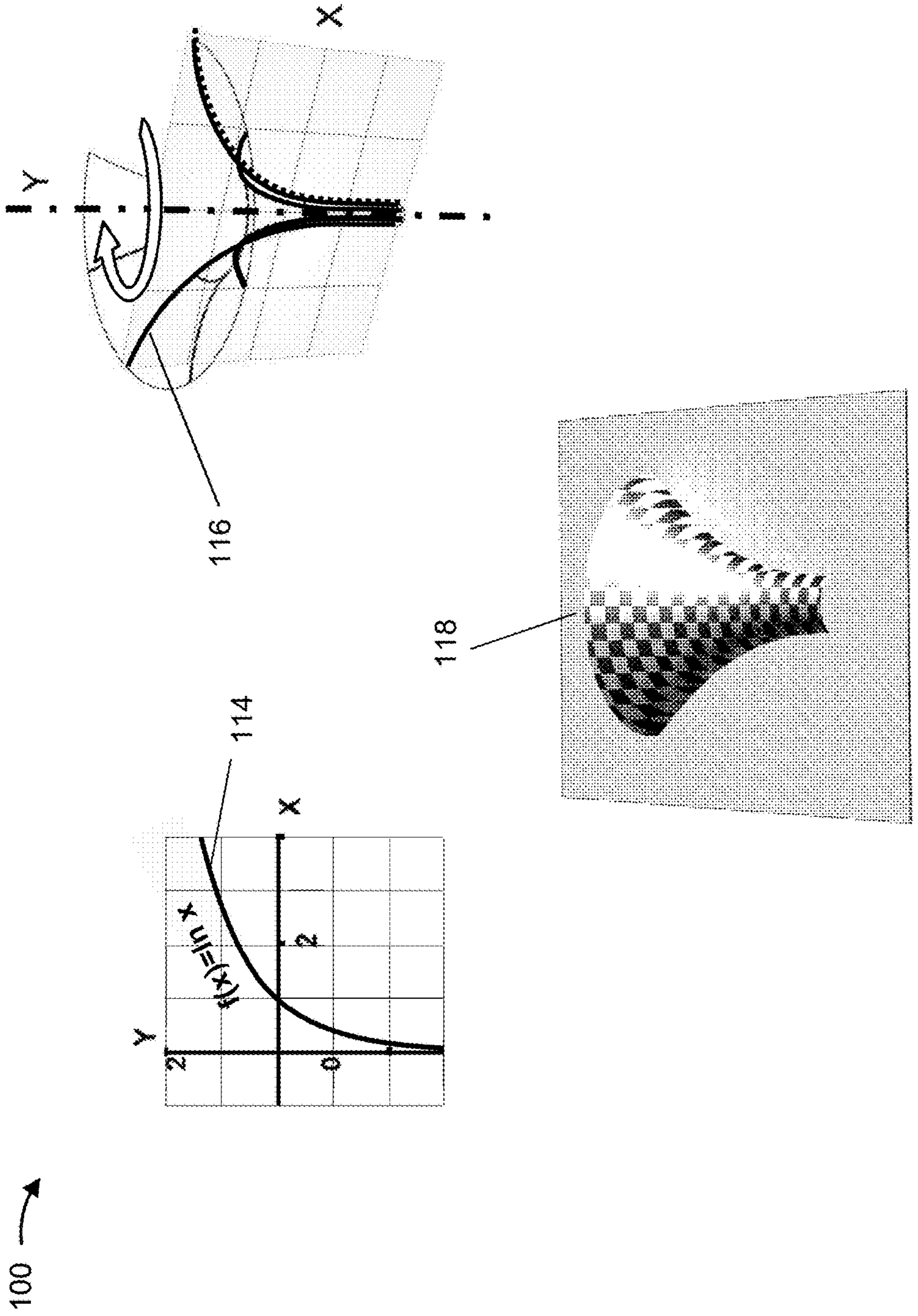

FIG. 1B shows examples of the surface of revolution used to generate the optical article 102 shown in FIG. 1A, as well as a curve used to generate the surface of revolution. The curve is shown by reference number 114. As shown, the curve may be defined based on a natural logarithm. In some implementations, the curve may be defined based on another mathematical relationship, such as a logarithm and/or the like. As shown by reference number 116, the surface of revolution may be generated by rotating the curve around the Y-axis. A checkered depiction of the surface of revolution is shown by reference number 118 for clarity.

The surface of revolution shown in FIG. 1B is shown for illustrative purposes only. The exact magnetic field used to align the magnetic platelets may differ from what is shown in FIG. 1B based on variations in magnet fabrication, challenges in shaping the magnetic field, or for other reasons. For example, the deviation of the field may vary in a range from approximately 0.03125" to 2" or more based on choice of the designer and selection of magnet size. It is to be understood that the surfaces of revolutions described herein are provided for exemplary and illustrative purposes only.

Figure 1C:
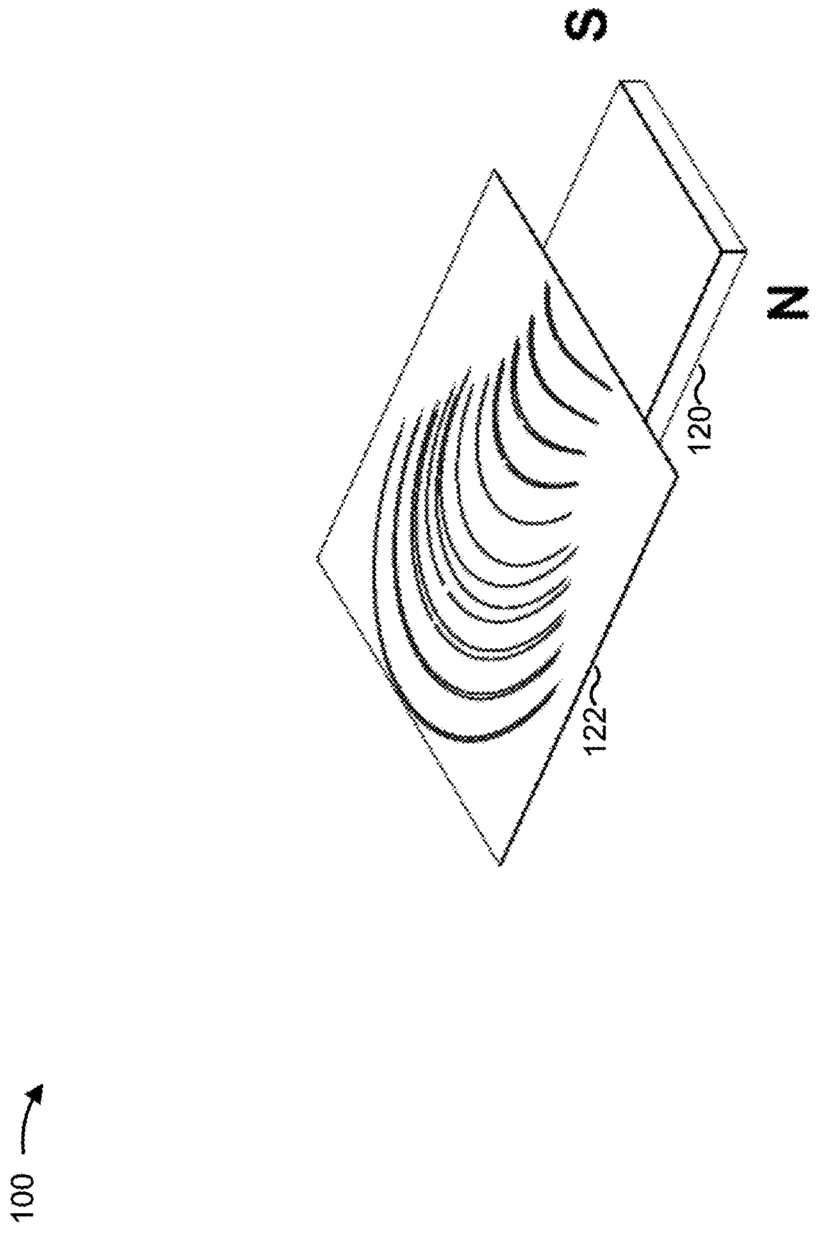

FIG. 1C shows an example of a configuration of a magnet 120 that may provide a magnetic field that approximates the surface of revolution shown by reference numbers 116 and 118 of FIG. 1B. A plane of the optical article 102 is shown by reference number 122. As can be seen, the lines of magnetic field created by such a magnet may have different radii in the plane 122. Thus, an optical article 102 that provides the funnel-shaped reflective effect shown in FIG. 1A may be formed based on the surface of revolution 116, 118 shown in FIG. 1B using the magnet 120 shown in FIG. 1C.

Figure 1D:
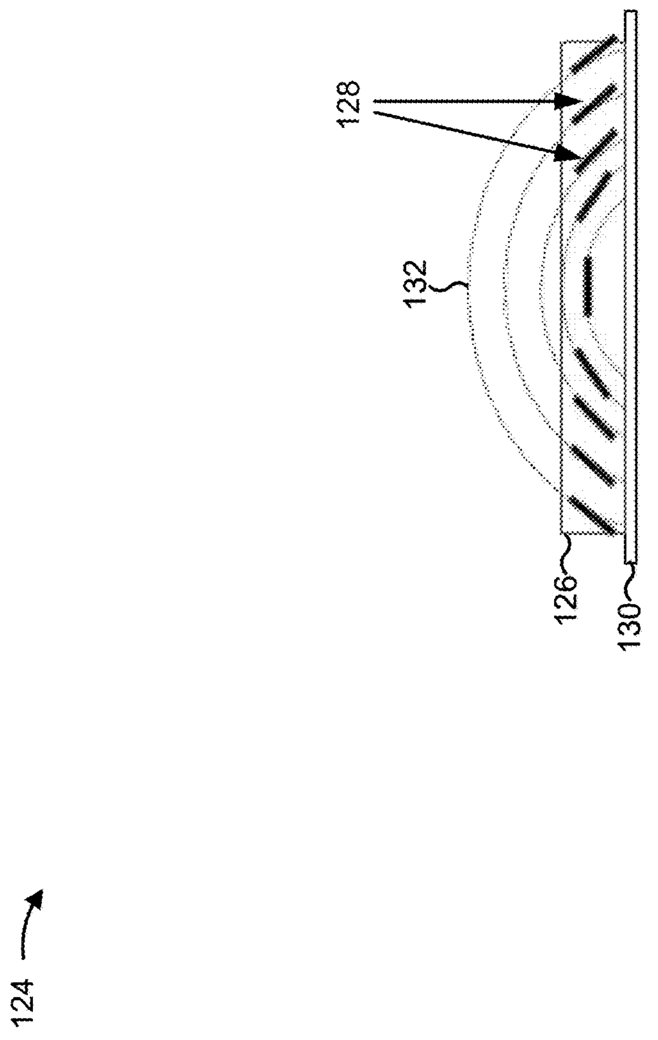

An example of an optical article 102 is shown by reference number 124 in FIG. 1D. For example, the example shown in FIG. 1D may represent a cross-section of the optical article 102 at a center of the optical article 102. As shown, the optical article 102 may include an organic binder 126 in which reflective magnetic platelets 128 are suspended. As further shown, the optical article 102 is provided on a substrate 130. The reflective magnetic platelets 128 may be aligned with magnetic field lines 132.

Figure 1E:
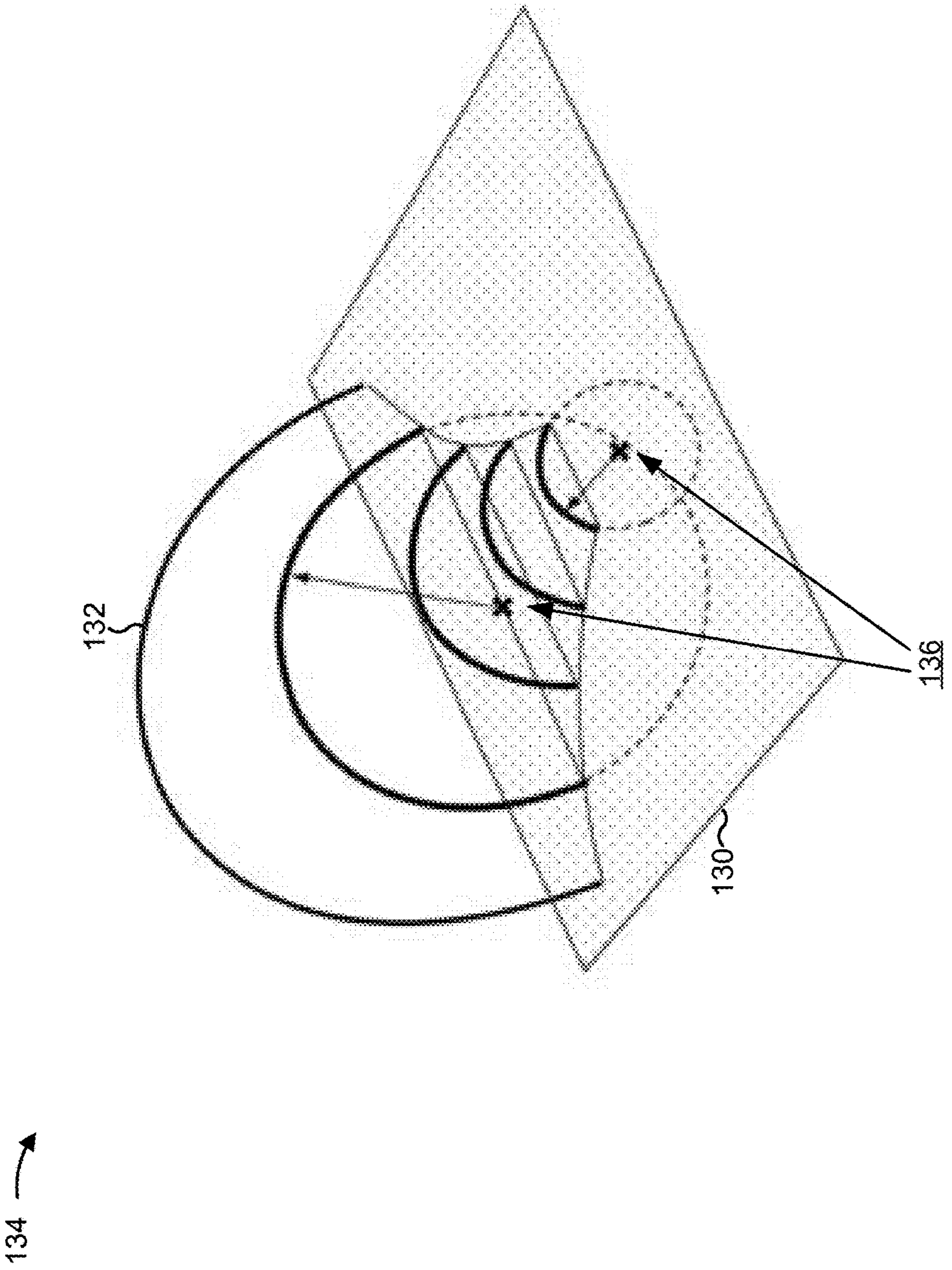

FIG. 1E shows an oblique view 134 of the magnetic field lines 132 of FIG. 1D. A central axis of the magnetic field represented by the magnetic field lines 132 is shown by the "x" symbols identified by reference number 136. As can be seen, the radii of the magnetic field lines 132 changes along the central axis. As shown, the central axis of the magnetic field is below the substrate 130 at a narrower cross-section of the magnetic field, and proceeds toward and through the substrate 130 as the magnetic field widens. Other implementations of the orientation of the central axis are possible. For example, the central axis may be provided entirely above the substrate, entirely below the substrate, parallel to the substrate, proceeding through the substrate, and/or the like.

As indicated above, FIGS. 1A-1E are provided as examples. Other examples are possible and may differ from what was described with regard to FIGS. 1A-1E.

Figure 2A:
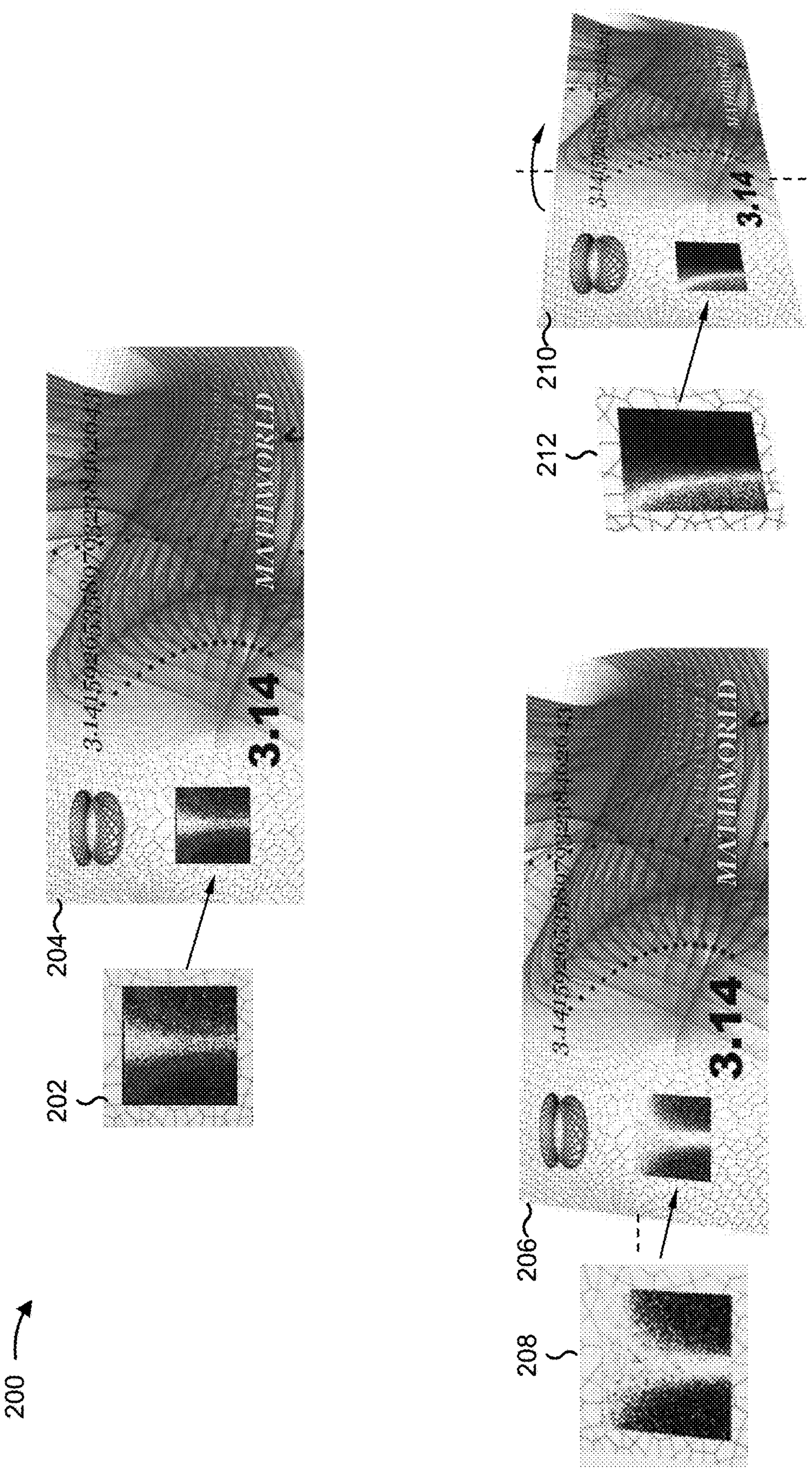
FIGS. 2A and 2B are diagrams of another optical article that is formed based on a funnel-shaped surface of revolution.
Figure 2B:
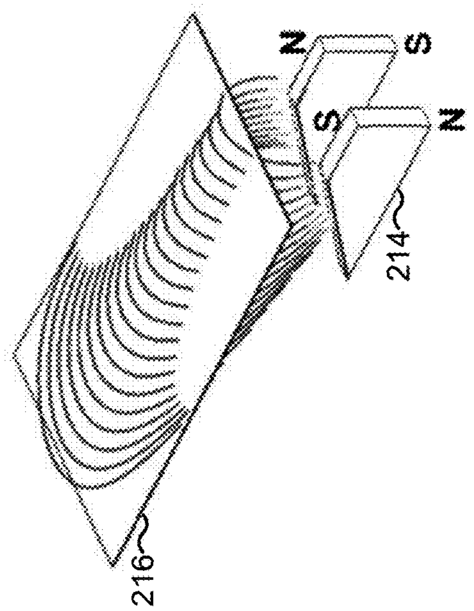

FIGS. 2A and 2B are diagrams of an example 200 of another optical article that is formed based on a funnel-shaped surface of revolution. The surface of revolution used for example 200 may be substantially similar to the one used for example 100 of FIGS. 1A-1D and, therefore, is not shown.

An expanded view of an optical article 202 in a first view (e.g., a head-on view without rotating a substrate 204 around an axis) is shown at the top of FIG. 2A. As shown, the optical article 202 exhibits a funnel-shaped reflection that is narrower at the top and wider at the bottom than the funnel-shaped reflection of optical article 102. This may be due to a difference in the shape and/or orientation of the magnets used to form the corresponding magnetic field, as described in connection with FIG. 2B, below.

As shown by reference number 206, when the substrate 204 (or the optical article 202) is rotated around a first axis (e.g., a horizontal axis), the rotation may cause a first reflective effect 208. Here, the first reflective effect 208 is a widening (in the horizontal direction) of a top of the funnel-shaped reflection and a narrowing (in the horizontal direction) of the bottom of the funnel-shaped reflection. As shown by reference number 210, when the substrate 204 (or the optical article 202) is rotated around a second axis (e.g., a vertical axis and/or an axis orthogonal to the first axis), the rotation may cause a second reflective effect 212 that is different from the first reflective effect 208. Here, the second reflective effect 212 is a shifting, to the left of a top of the funnel-shaped reflection.

FIG. 2B shows an example of a configuration of a set of magnets 214 that may provide a magnetic field that approximates a surface of revolution that may be used to create the optical article 202. A plane of the optical article 202 is shown by reference number 216. As shown, the arrangement of the set of magnets 214 may provide a magnetic field with an elongated shape in comparison to the magnetic field shown in FIG. 1C. In some aspects, more than two magnets 214 may be used. For example, any number of magnets 214 may be used to generate the magnetic field shown. Thus, an optical article 202 that provides the funnel-shaped reflective effect shown in FIG. 2A may be formed using the set of magnets 214 shown in FIG. 2B.

As indicated above, FIGS. 2A and 2B are provided merely as an example. Other examples are possible and may differ from what was described with regard to FIGS. 2A and 2B.

Figure 3A:
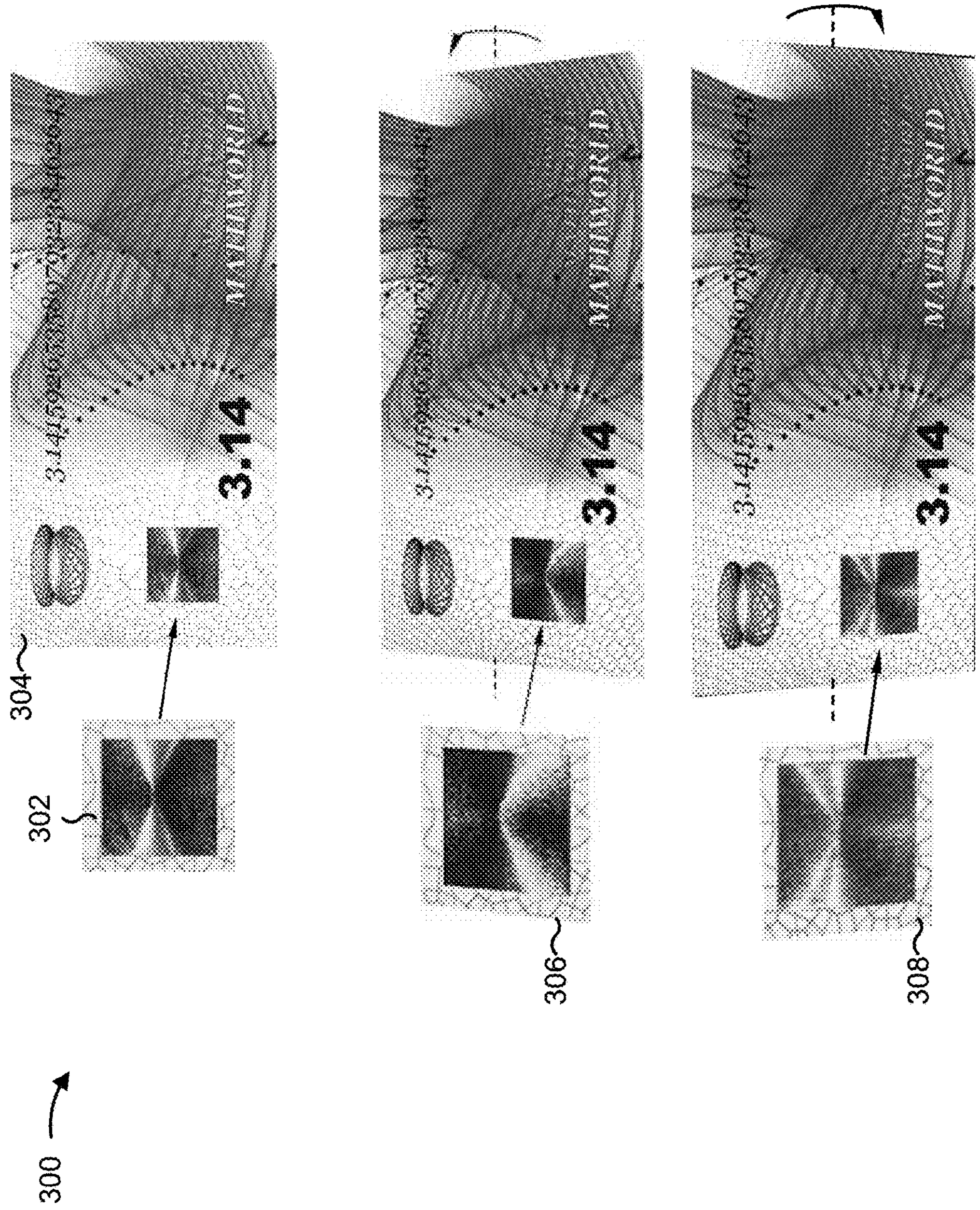
FIGS. 3A-3D are diagrams of an optical article that is formed based on a saddle-shaped surface of revolution.

FIGS. 3A-3D are diagrams of an example 300 of an optical article that is formed based on a saddle-shaped surface of revolution. An expanded view of an optical article 302 in a first view (e.g., a head-on view without rotating a substrate 304 around an axis) is shown at the top of FIG. 3A. As shown, the optical article 302 exhibits a saddle-shaped reflective effect (for an example of a saddle shape, refer to the saddle-shaped surface of revolution of FIG. 3C, described in more detail below).

As shown by reference number 306, when the optical article 302 is rotated in a first direction about a first axis (e.g., a horizontal axis), the rotation may cause a first reflective effect, in which the reflection moves downward at the edges while the center remains substantially unmoved. For example, left and right portions of the reflection may bend downward. As shown by reference number 308, when the optical article 302 is rotated in a second direction about the first axis, the reflection moves upward at the edges while the center remains substantially unmoved. For example, the left and right portions of the reflection may bend upward. As can be seen, the regions of the optical article 302 that are not occupied by the band of reflected light (e.g., the triangular sections at the top center and the bottom center of the optical article 302) remain dark when the optical article 302 is rotated about the first axis.

Figure 3B:
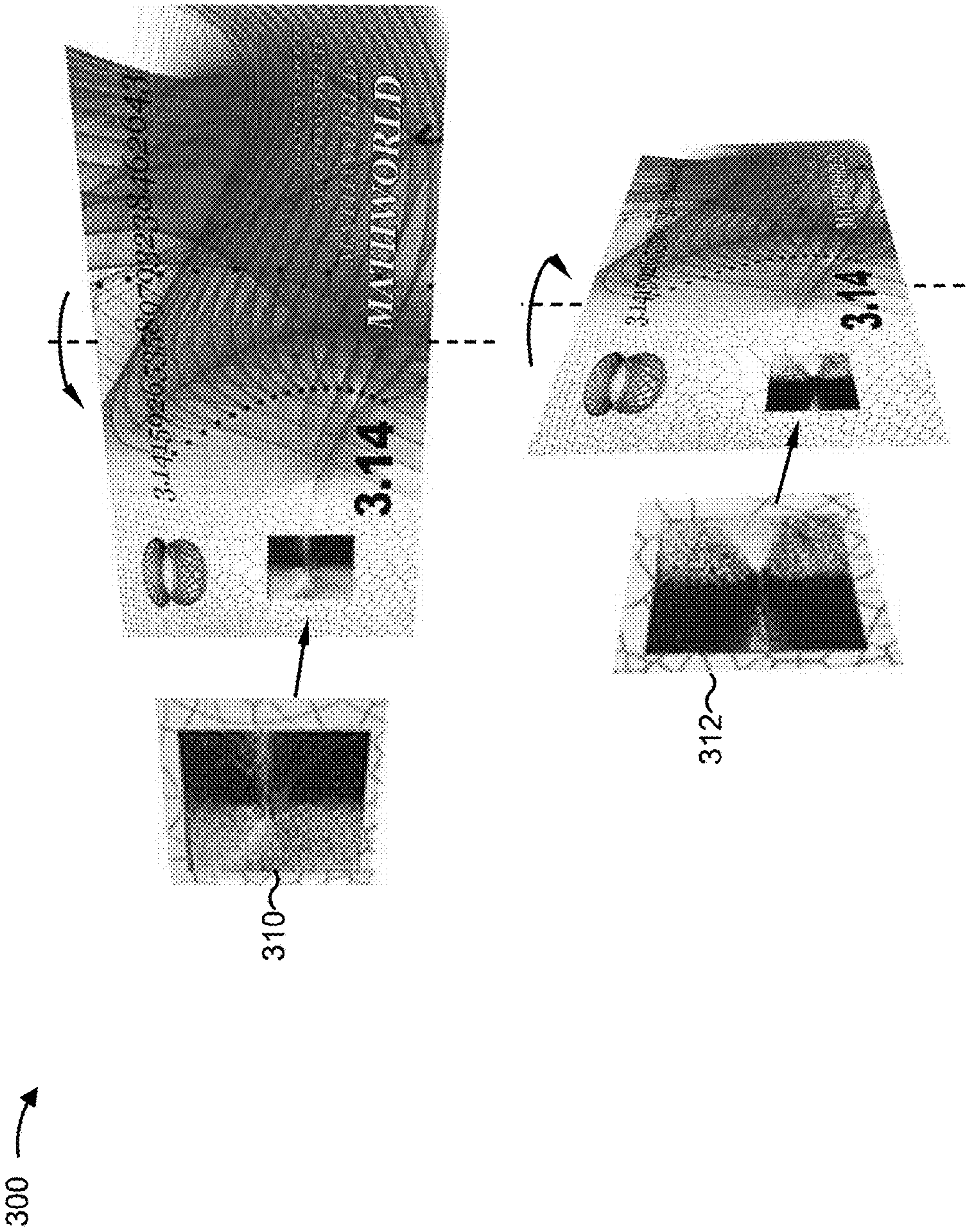

As shown in FIG. 3B, and by reference number 310, when the optical article 302 is rotated in a first direction about a second axis (e.g., a vertical axis and/or an axis orthogonal to the first axis), the rotation may cause a second reflective effect. Here, the second reflective effect is a brightening of the left half (e.g., a first half) of the optical article 302 and a darkening of the right half (e.g., a second half) of the optical article 302. Similarly, as shown by reference number 312, when the optical article 302 is rotated in a second direction about the second axis, the second reflective effect is the illumination of the right half of the optical article 302.

Figure 3C:
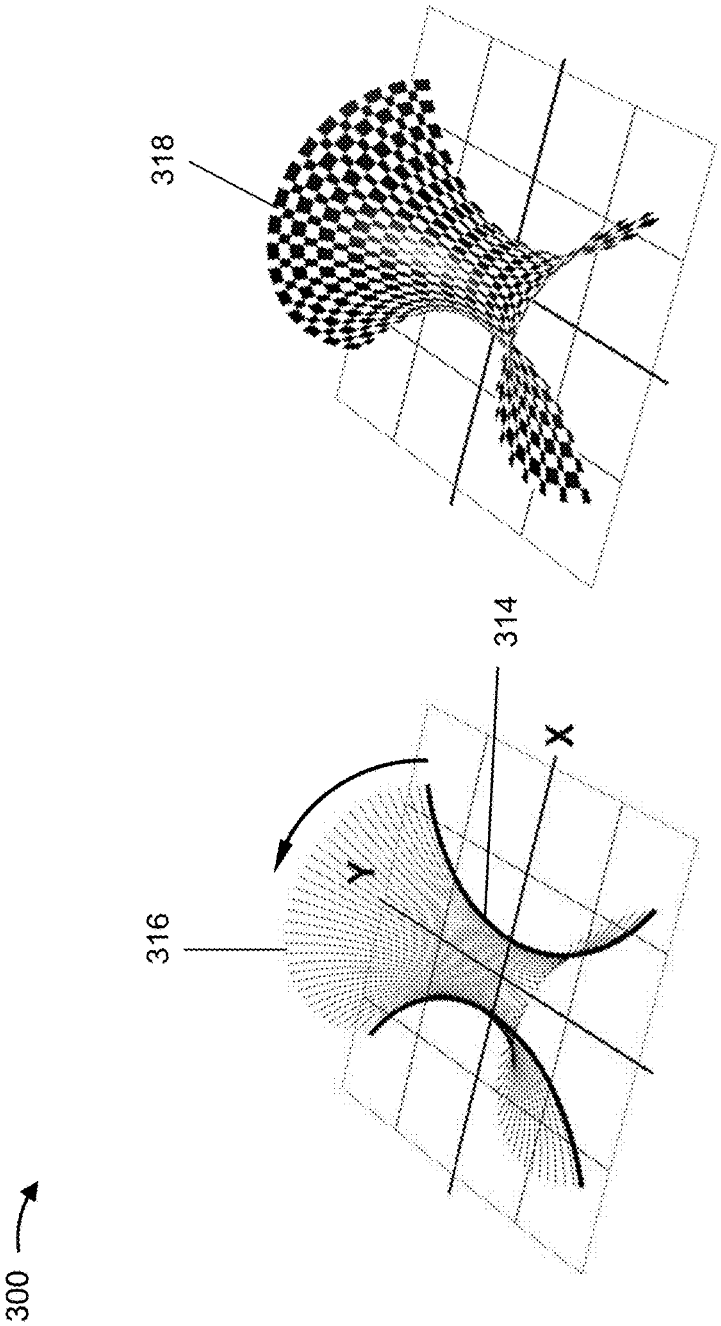

FIG. 3C shows an example of a curve 314 that may be used to generate a saddle-shaped surface of revolution 316, 318. In some implementations, the curve 314 may be a parabola (e.g., defined by the equation x=b*y^2+c (b and c not shown in FIG. 3C)) or a hyperbola, and the surface of revolution 316, 318 may be a hyperbolic parabola or a section or a hyperbolic parabola.

Figure 3D:
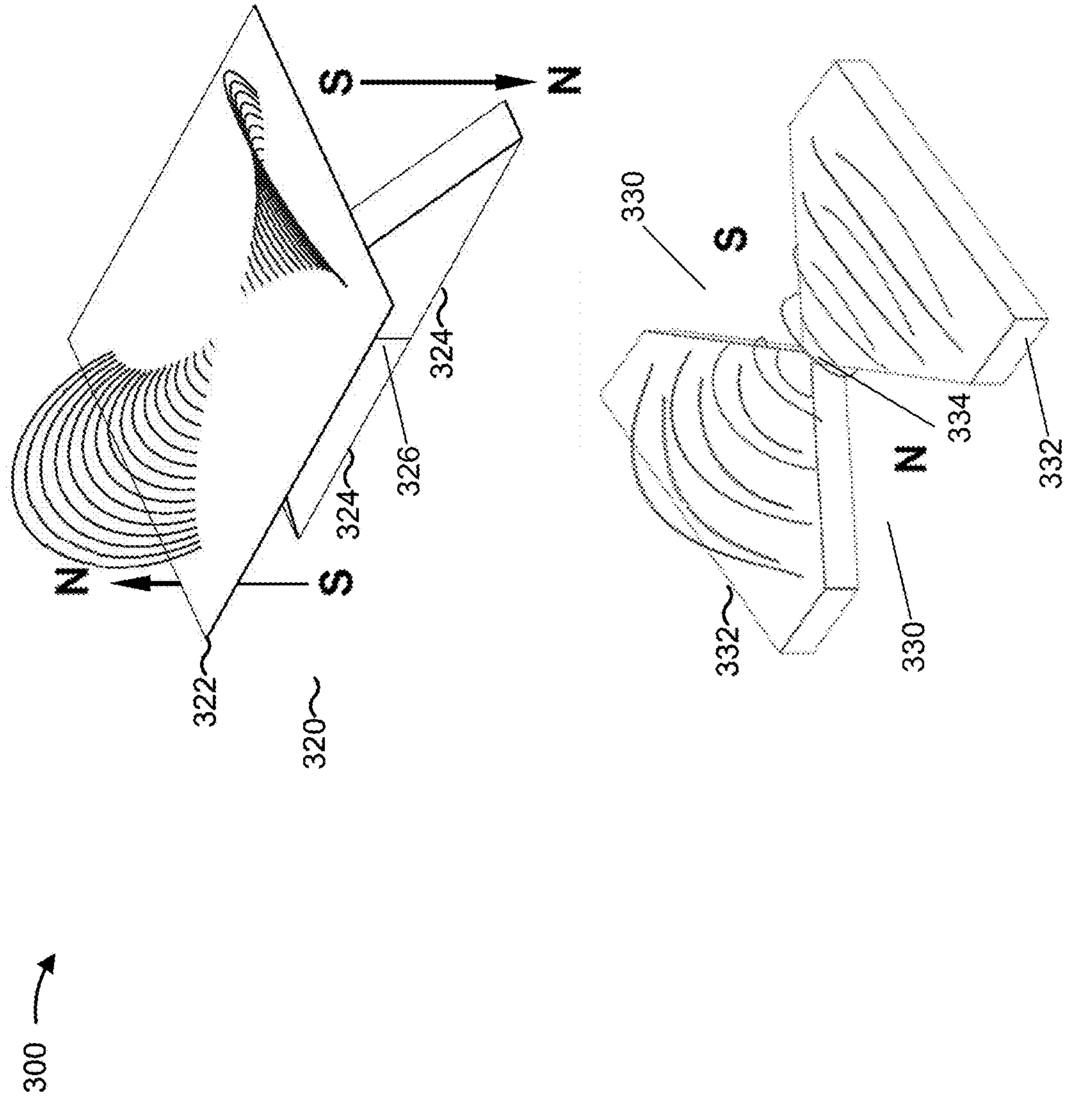

FIG. 3D shows examples of configurations of magnets that can be used to generate magnetic fields based on the saddle-shaped surface of revolution 316, 318 in order to form the optical article 302. As shown by reference number 320, a first configuration of magnets may include substantially triangular magnets provided in a coplanar fashion in a plane orthogonal to the plane 322 of the optical article 302. For example, first sides 324 of the two substantially triangular magnets may be provided parallel to and distal from the plane 322, and second sides 326 of the two substantially triangular may be provided in a plane perpendicular to the organic binder and in contact with (or spaced near) one another. As shown by reference number 328, a second configuration may include a magnet with triangular notches 330. In some implementations, the second configuration may use two triangular magnets that meet at a center point with rectangular portions 332 distal from the center point 334.

As indicated above, FIGS. 3A-3D are provided merely as an example. Other examples are possible and may differ from what was described with regard to FIGS. 3A-3D.

Figure 4:
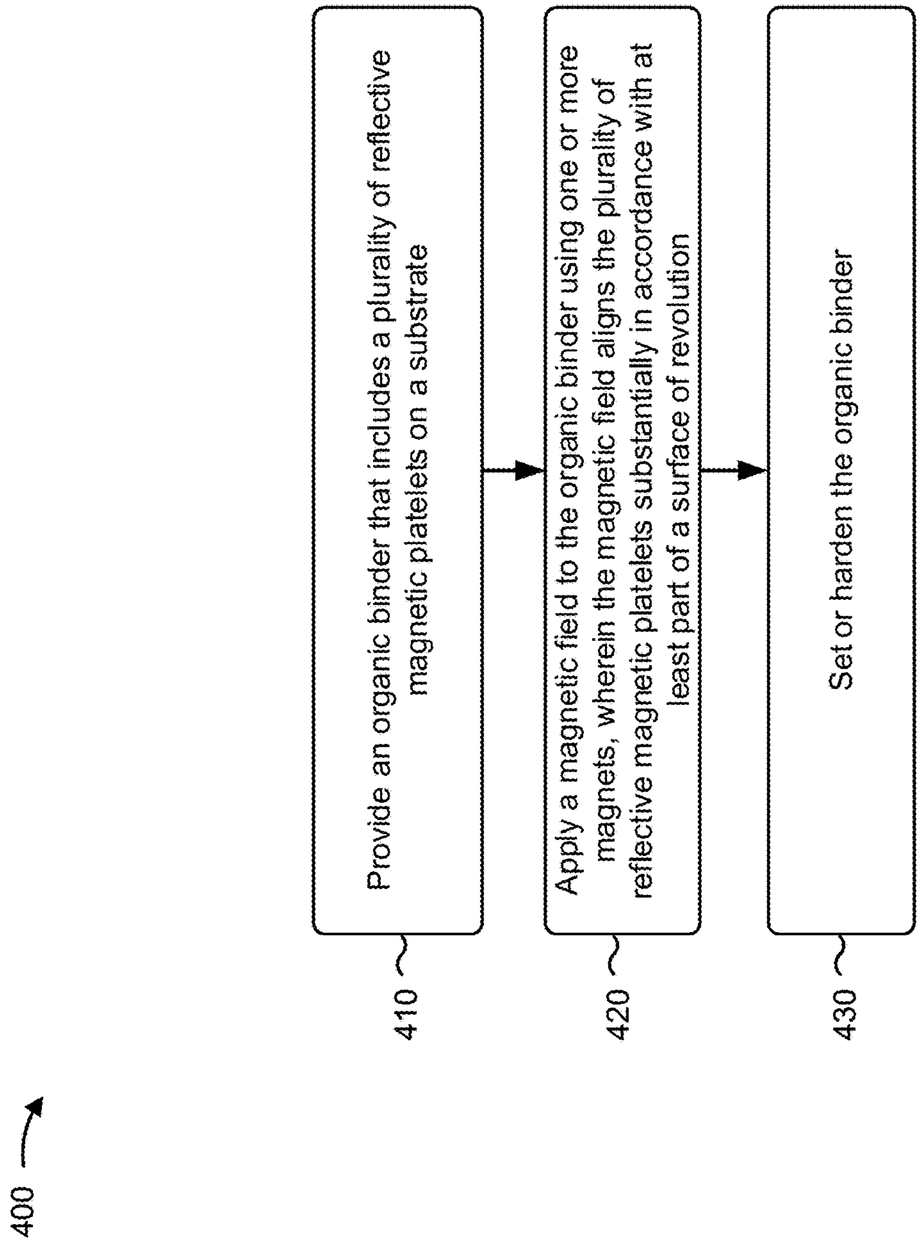
FIG. 4 is a flow chart of an example process for forming an optical article based on a surface of revolution.

FIG. 4 is a flow chart of an example process 400 for forming an optical article in accordance with various implementations described herein. One or more of the operations described in FIG. 4 may be performed by a system, such as a system capable of providing an organic binder that includes reflective magnetic platelets, applying a magnetic field to the organic binder, and setting or hardening the organic binder.

As shown in FIG. 4, process 400 may include providing an organic binder that includes a plurality of reflective magnetic platelets on a substrate (block 410). For example, an organic binder may be provided on a substrate. The organic binder may be an ink or another substance that can be set or hardened by a chemical reaction, and that is at least partially transparent. In some implementations, the organic binder may be a highly reactive UV ink for sheetfed and web offset presses that cures using UV lamp technology, such as a UV-curable ink (e.g., XCURA EVO ink by Flint Group, Ultraking 6100 FAST CURE by Flint Group, etc). For example, a UV-curable ink may include four components: monomers, oligomers, pigments, and photoinitiators. The monomers may provide a building block of the ink, and may contribute certain properties such as softness or hardness of the ink when cured, as well as flexibility or elongation characteristics of the ink for varying types of applications. The oligomers in the ink formulation include reactive resins and uniquely formulated adhesive components for printing on a wide range of different substrates. The pigments provide the color. When the photoinitiators are exposed to UV light, the oligomers and monomers cross-link or polymerize.

The organic binder may include a plurality of reflective magnetic platelets. The platelets may include substantially flat particles with dimensions in a range from approximately 10 μm×10 μm×0.5 μm to approximately 100 μm×100 μm×10 μm. The particles may include layers of different materials. One or more of the materials can be magnetized in the field of an external magnet or external magnet. In some cases, the reflective magnetic platelet is one of many security pigment particles. The reflective magnetic may include a layer made from magnetically soft or hard material, such as a ferromagnetic alloys. The central core may be coated with two or more layers of aluminum as a reflector. The aluminum layers may be coated with a transparent material such as $MgF_2$, $SiO_2$, or the like. A semi-transparent chromium layer may be coated on the top of the transparent material. This particular material is known as a security optically variable magnetic pigment (OVMP). The pigment may be mixed with a UV-curable organic binder described above to form a security optically variable magnetic ink (OVMI) used for printing of anti-counterfeiting security elements on documents of value.

In some implementations, the substrate may be a document, or may be affixed to a document. In some implementations, the organic binder and the platelets (and optionally the substrate) may be referred to collectively as an optical article.

As further shown in FIG. 4, process 400 may include applying a magnetic field to the organic binder using one or more magnets, wherein the magnetic field aligns the plurality of reflective magnetic platelets substantially in accordance with at least part of a surface of revolution (block 420). For example, a magnetic field may be applied to the organic binder using one or more magnets. In some implementations, an electrical or electromagnetic field may be used to generate a magnetic field to be applied to the organic binder to align the plurality of reflective magnetic platelets. For example, the electrical field may have substantially the shape described with regard to examples 100, 200, and/or 300. The magnetic field may align the plurality of reflective magnetic platelets substantially in accordance with at least part of a surface of revolution. For example, the magnetic field may have substantially the shape of the at least part of the surface of revolution. In some implementations, the plurality of reflective magnetic platelets may be aligned to cause a first reflective effect of the optical article when the substrate is rotated around a first axis. Furthermore, the plurality of reflective magnetic platelets may be aligned to cause a second reflective effect of the optical article when the substrate is rotated around a second axis. The first reflective effect may be different than the second reflective effect.

As further shown in FIG. 4, process 400 may include setting or hardening the organic binder (block 430). For example, the organic binder (e.g., the ink) may be set or hardened. This may lock the reflective platelets in the alignment of the magnetic (or electrical or electromagnetic) field. In some implementations, the organic binder may be set or hardened using an ultraviolet light, using heat, based on a curing technique, and/or the like.

Process 400 may include additional implementations, such as any single implementation or any combination of implementations described below and/or in connection with one or more other processes described elsewhere herein.

In some implementations, the surface of revolution is defined based on a natural logarithm. In some implementations, the surface of revolution is substantially funnel-shaped. In some implementations, the surface of revolution is defined based on a parabola or hyperbola. In some implementations, the surface of revolution is substantially shaped as a hyperbolic paraboloid. In some implementations, the first axis is a horizontal axis and the second axis is a vertical axis. In some implementations, the first axis is orthogonal to the second axis.

In some implementations, the one or more magnets include two magnets provided parallel to each other, and corners of the two magnets are cut off or rounded. In some implementations, the one or more magnets include two substantially triangular magnets that are provided in a coplanar fashion. In some implementations, first sides of the two substantially triangular magnets are provided parallel to and distal from the organic binder, and wherein second sides of the two substantially triangular magnets are provided perpendicular to the organic binder and in contact with each other. In some implementations, the one or more magnets include a magnet with two or more triangular notches.

In some implementations, the first reflective effect is a widening of a first portion of a reflection from the optical article and a narrowing from a second portion of the reflection the optical article. In some implementations, the second reflective effect is a first lateral motion of a first portion of a reflection from the optical article that is larger than a second lateral motion of a second portion of the reflection from the optical article.

In some implementations, the first reflective effect is a first movement of left and right portions of a reflection from the optical article that is larger than a second movement of a center portion of the reflection from the optical article. In some implementations, the second reflective effect is a brightening of a first half of a reflection from the optical article and a darkening of a second half of the reflection from the optical article.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, reflective effects that are different when an optical article is rotated about different axes are provided. This may improve complexity of the optical article. Thus, security of a document that uses the optical article is improved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical article printed on a substrate, comprising:

a plurality of reflective magnetic platelets, wherein the plurality of reflective magnetic platelets are aligned to exhibit a first reflective effect in a first view, wherein the first reflective effect comprises a hyperbolic parabola shaped reflective effect, wherein the first view is a head-on view without rotating the optical article around an axis, and wherein the plurality of reflective magnetic platelets are configured to cause a second reflective effect in a second view.

2. The optical article of claim 1, wherein the hyperbolic parabola shaped reflective effect comprises exhibiting a hyperbolic parabola.

3. The optical article of claim 1, wherein the second view is when the optical article is rotated about the axis in a first direction.

4. The optical article of claim 3, wherein the second reflective effect comprises a reflection moving downward at edges while a center of the reflection remains substantially unmoved.

5. The optical article of claim 4, wherein the reflection moving downward at the edges comprises left and right portions of the reflection bending downward.

6. The optical article of claim 4, wherein the second reflective effect further comprises moving upward at the edges while the center of the reflection remains substantially unmoved when the optical article is rotated about the axis in a second direction.

7. The optical article of claim 3, wherein the axis is a horizontal axis.

8. The optical article of claim 3, wherein triangular sections at a top center and a bottom center of the optical article are configured to be perceived as dark when the optical article is rotated about the axis.

9. The optical article of claim 3, wherein the plurality of reflective magnetic platelets are configured to cause a third reflective effect in a third view.

10. The optical article of claim 9, wherein the third view is when the optical article is rotated about a different axis that is orthogonal to the axis.

11. The optical article of claim 3, wherein the second reflective effect comprises a brightening of a portion of the optical article.

12. The optical article of claim 11, wherein the second reflective effect further comprises a darkening of a different portion of the article.

13. The optical article of claim 11, wherein the portion of the optical article is a half of the optical article.

14. The optical article of claim 1, wherein the hyperbolic parabola shaped reflective effect comprises exhibiting a hyperbolic parabola shaped surface and a curve that is a parabola or a hyperbola.

15. The optical article of claim 1, wherein the plurality of reflective magnetic platelets comprise substantially triangular magnets provided in a coplanar fashion in a plane orthogonal to a plane of the optical article.

16. The optical article of claim 1, wherein the plurality of reflective magnetic platelets comprise a magnet with triangular notches.

17. The optical article of claim 1, wherein the plurality of reflective magnetic platelets comprise two triangular magnets that meet at a center point.

18. The optical article of claim 17, wherein the two triangular magnets comprise rectangular portions distal from the center point.

19. An optical article, comprising:

one or more magnets, wherein the one or more magnets are configured to exhibit a hyperbolic parabola shaped reflection in a head-on view without rotating the optical article around a first axis or a second axis, wherein the one or more magnets are configured to exhibit a first reflective effect when the optical article is rotated about the first axis, and wherein the one or more magnets are configured to exhibit a second reflective effect when the optical article is rotated about the second axis that is orthogonal to the first axis.

20. The optical article of claim 19, wherein the first reflective effect comprises a reflection moving downward at edges while a center of the hyperbolic parabola shaped reflection remains substantially unmoved.

* * * * *